United States Patent
Chen et al.

(10) Patent No.: US 7,620,839 B2
(45) Date of Patent: Nov. 17, 2009

(54) JITTER TOLERANT DELAY-LOCKED LOOP CIRCUIT

(75) Inventors: Zheng (Jeff) Chen, Allentown, PA (US); Phillip Johnson, Hellertown, PA (US); Fulong Zhang, Allentown, PA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 496 days.

(21) Appl. No.: 11/302,097

(22) Filed: Dec. 13, 2005

(65) Prior Publication Data

US 2007/0136619 A1    Jun. 14, 2007

(51) Int. Cl.
*G06F 1/04* (2006.01)
(52) U.S. Cl. .................... 713/503; 713/500
(58) Field of Classification Search .......... 713/500–503
See application file for complete search history.

(56) References Cited

U.S. PATENT DOCUMENTS

| | | | |
|---|---|---|---|
| 6,194,928 B1 * | 2/2001 | Heyne | 327/152 |
| 6,806,750 B1 | 10/2004 | Rasmussen et al. | |
| 6,950,956 B2 | 9/2005 | Zerbe et al. | |
| 2001/0043102 A1 * | 11/2001 | Kuge | 327/161 |
| 2003/0001650 A1 * | 1/2003 | Cao et al. | 327/277 |
| 2003/0152181 A1 | 8/2003 | Stengel et al. | |
| 2003/0227305 A1 * | 12/2003 | Mikhalev et al. | 327/141 |
| 2004/0222830 A1 * | 11/2004 | Knupfer | 327/156 |
| 2004/0239387 A1 | 12/2004 | Zhang et al. | |

OTHER PUBLICATIONS

International Search Report and Written Opinion of the ISA, mailed to applicant Apr. 7, 2008.
U.S. Appl. No. 10/701,005, Johnson et al.

* cited by examiner

*Primary Examiner*—Mark Connolly
*Assistant Examiner*—Paul B Yanchus, III
(74) *Attorney, Agent, or Firm*—Haynes and Boone, LLP

(57) ABSTRACT

Systems and methods are disclosed herein to provide improved jitter tolerant delay-locked loop circuitry. For example, in accordance with an embodiment of the present invention, an integrated circuit includes a plurality of delay cells each having a plurality of programmable delay taps. Each delay cell is adapted to provide a delayed clock signal delayed by a selected number of the delay taps. A phase detector is adapted to compare a first clock signal with a selected one of the delayed clock signals to obtain a comparison result and provide a plurality of control signals in response to the comparison result. An arithmetic logic unit (ALU) is adapted to vary the selected number of delay taps in response to the control signals provided by the phase detector.

9 Claims, 6 Drawing Sheets

JITTER TOLERANT DELAY-LOCKED LOOP CIRCUIT

TECHNICAL FIELD

The present invention relates generally to electrical circuits and, more particularly, to the application of delays and control of delay cells in integrated circuits.

BACKGROUND

Phase-locked loop (PLL) and delay-locked loop (DLL) circuits are common clock elements generally used for clock phase shifting or clock injection delay removal and embedded in programmable logic devices (PLDs) and other integrated circuits. DLL circuits typically require a smaller chip area to implement and often have a more straightforward layout design than PLL circuits. Accordingly, DLL circuits are often preferred over PLL circuits.

Unfortunately, DLL circuits can be more susceptible to clock jitter caused by PVT (i.e., process, voltage, temperature) changes than PLL circuits. As a result, output clock signals provided by DLL circuits may exhibit substantial PVT-induced jitter.

In addition, because DLL circuits typically cannot remove clock jitter from input clock signals, such jitter may inhibit DLL circuits from maintaining a consistent phase lock with input clock signals. When phase lock is lost, glitches and additional jitter may appear in the output clock signals provided by DLL circuits. As input clock signals are passed through delay cells of DLL circuits, the duty cycle of output clock signals provided by the DLL circuits can also degrade.

Accordingly, there is a need for an improved DLL circuit that is jitter tolerant and can reduce the possibility of clock glitches and duty cycle variance appearing in output clock signals.

SUMMARY

In accordance with one embodiment of the present invention, an integrated circuit includes a plurality of delay cells each having a plurality of programmable delay taps, wherein each delay cell is adapted to provide a delayed clock signal delayed by a selected number of the delay taps; a phase detector adapted to compare a first clock signal with a selected one of the delayed clock signals to obtain a comparison result and provide a plurality of control signals in response to the comparison result; and an arithmetic logic unit (ALU) adapted to vary the selected number of delay taps in response to the control signals provided by the phase detector.

In accordance with another embodiment of the present invention, a method of phase shifting clock signals includes receiving a first clock signal; delaying the first clock signal by a first delay time corresponding to a plurality of delay taps to obtain a second clock signal; comparing the first clock signal with the second clock signal; providing a phase lock signal if the first clock signal and the second clock signal have a phase difference less than a second delay time; providing a delay tap increment signal if the second clock signal leads the first clock signal by more than one delay tap; and providing a delay tap decrement signal if the second clock signal lags the first clock signal by more than one delay tap.

In accordance with another embodiment of the present invention, an integrated circuit includes means for receiving a first clock signal; means for delaying the first clock signal by a first delay time corresponding to a plurality of delay taps to obtain a second clock signal; means for comparing the first clock signal with the second clock signal; means for providing a phase lock signal if the first clock signal and the second clock signal have a phase difference less than a second delay time; means for providing a delay tap increment signal if the second clock signal leads the first clock signal by more than one delay tap; and means for providing a delay tap decrement signal if the second clock signal lags the first clock signal by more than one delay tap.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The various techniques disclosed herein are applicable to a wide variety of integrated circuits and applications. It should be understood that the techniques disclosed herein may be implemented as desired, in accordance with one or more embodiments of the present invention, within various types of circuits and within the various types of integrated circuits including but not limited to programmable logic devices (PLDs).

Figure 1:
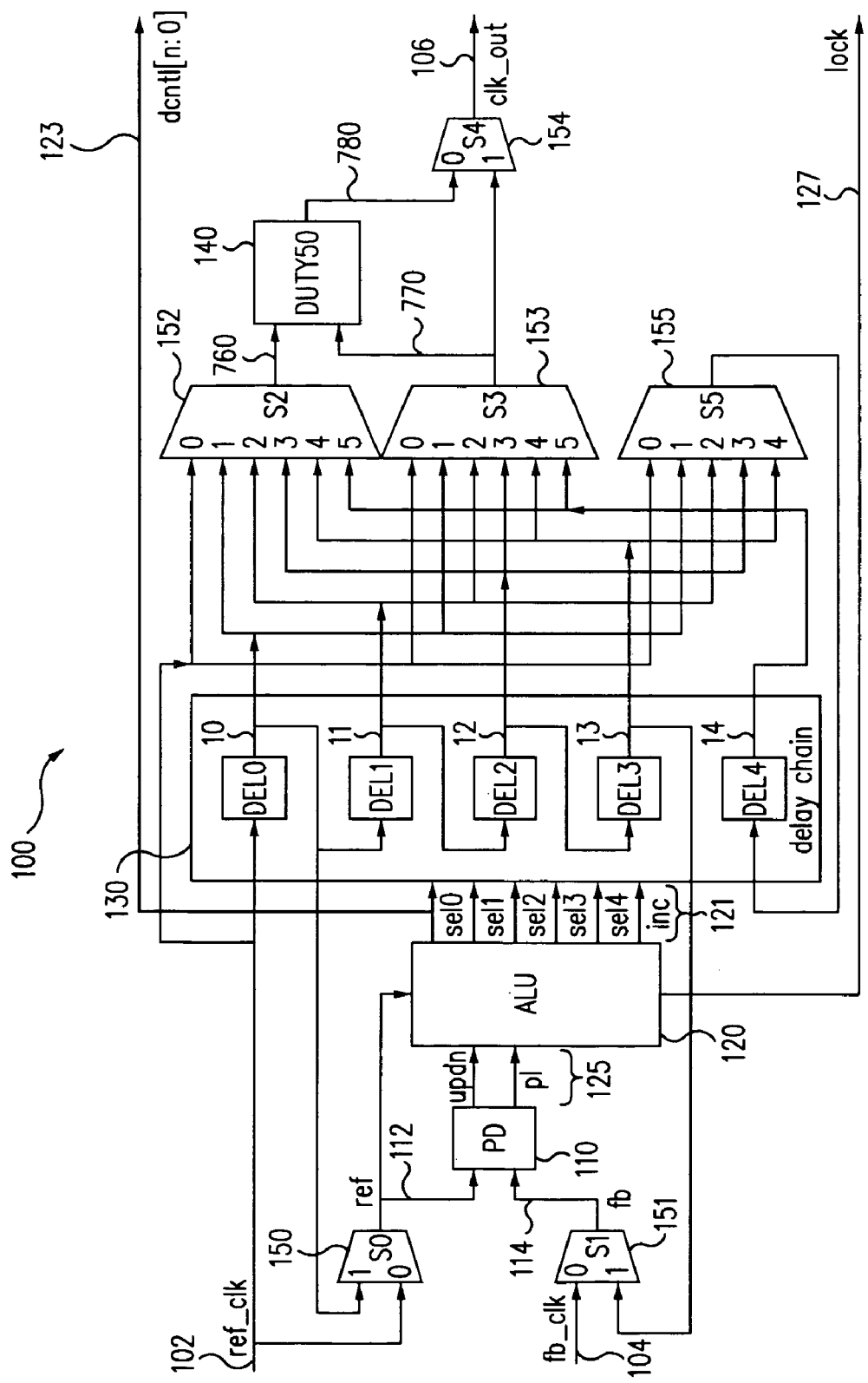
FIG. 1 illustrates a block diagram of a delay-locked loop (DLL) circuit in accordance with an embodiment of the present invention.

FIG. 1 illustrates a block diagram of a delay-locked loop (DLL) circuit 100 in accordance with an embodiment of the present invention. As illustrated, DLL circuit 100 includes a plurality of multiplexers 150-155 (labeled S0-S5), a phase detector block 110, an arithmetic logic unit (ALU) 120, a delay chain 130 including a plurality of delay cells DEL0-4, and a duty cycle block 140.

The delay cells DEL0-4 of delay chain 130 can be programmed by ALU 120 through a plurality of control signals 121 to provide a selectable number of delay taps. For example, in one embodiment, each of delay cells DEL0-4 can be programmed to provide up to a maximum of 128 delay taps of 30 psec. Each of delay cells DEL0-4 can be implemented if desired as a digitally controlled delay cell in the manner described in U.S. patent application Ser. No. 10/447,451 entitled "DIGITALLY CONTROLLED DELAY CELLS," which is incorporated herein by reference in its entirety.

As illustrated, a reference clock signal 102 (labeled ref_clk) is received by delay cell DEL0 and passed through each of delay cells DEL0-3 in series, with corresponding delayed clock signals 10-13 from the delay cells DEL0-3 provided to multiplexers 152, 153, and 155. The signal selected by multiplexer 155 is provided to the delay cell DEL4, which provides a delayed clock signal 14 to multiplexers 152 and 153. In addition, any of delayed clock signals 10-14 may be selectively provided to duty cycle block 140 and multiplexer 154. The signal selected by multiplexer 154 is provided as an output clock signal 106 (labeled clk_out).

Multiplexer 150 receives reference clock signal 102 and the signal provided from the delay cell DEL0. Multiplexer 151 receives a feedback clock signal 104 (labeled fb_clk) as well as the signal provided from the delay cell DEL3. Signals selected by multiplexers 150 and 151 are provided as a REF clock signal 112 and a FB clock signal 114, respectively, to phase detector block 110. As further described herein, phase detector block 110 provides a plurality of control signals 125 to ALU 120. In response to control signals 125, ALU 120 selectively increments or decrements the number of delay taps utilized by one or more of the delay cells DEL0-4 until REF clock signal 112 and FB clock signal 114 are phase locked with each other, as further described herein.

DLL circuit 100 can be operated in a plurality of modes as may be desired in particular applications. For example, in a time reference mode, reference clock signal 102 may be passed through multiplexer 150 to phase detector block 110 as REF clock signal 112. Reference clock signal 102 may also pass through four delay cells DEL0-3 to input 1 of multiplexer 151 which is provided to phase detector block 110 as FB clock signal 114. When REF clock signal 112 and FB clock signal 114 are phase locked (for example, through the programming of approximately equal numbers of delay taps for each of delay cells DEL0-3), the aggregate delay time of delay cells DEL0-3 can correspond to one clock cycle of reference clock signal 102 such that the delayed clock signals 10-13 output from each of delay cells DEL0-3 will exhibit phase shifts of 90 degrees, 180 degrees, 270 degrees, and 360 degrees, respectively, from reference clock signal 102. In this mode, the delay cell DEL4 can be used to phase shift delayed clock signal 14 by additional amounts, such as 45 degrees.

In a clock injection removal mode, reference clock signal 102 is sent to one or more of delay cells DEL0-4 and out through multiplexer 154 to provide output clock signal 106. Output clock signal 106 is then sent through a system clock distribution (not shown) and returned as feedback clock 104 to multiplexer 151 to be provided as FB clock signal 114 to phase detector block 110. Reference clock signal 102 is provided to phase detector block 110 as REF clock signal 112. When REF clock signal 112 and FB clock signal 114 are phase locked in this mode, the aggregate delay time of the one or more delay cells DEL0-4 and the system clock distribution will correspond to an integer multiple of the clock cycle of reference clock signal 102.

In a clock injection match mode, reference clock signal 102 is sent through multiplexers 153 and 154 to provide output clock signal 106 without passing through any of the delay cells DEL0-4. Delayed clock signal 10 from delay cell DEL0 is provided as REF clock signal 112 to phase detector block 110. Output clock signal 106 is sent through the system clock distribution and returned as feedback clock 104 to multiplexer 151 and then provided as FB clock signal 114 to phase detector block 110. When REF clock signal 112 and FB clock signal 114 are phase locked in this mode, the delay time of DEL0 will correspond to the system clock distribution delay.

As a result, control signals 123, which represent control signals 121 or a subset of control signals 121 from ALU 120 such as the subset responsible for programming delay cell DEL0 (for example, implemented as a 7-bit bus for controlling a 128-tap delay cell), can be provided to one or more digitally controlled delay cells, such as those described in U.S. patent application Ser. No. 10/447,451.

Figure 2A:
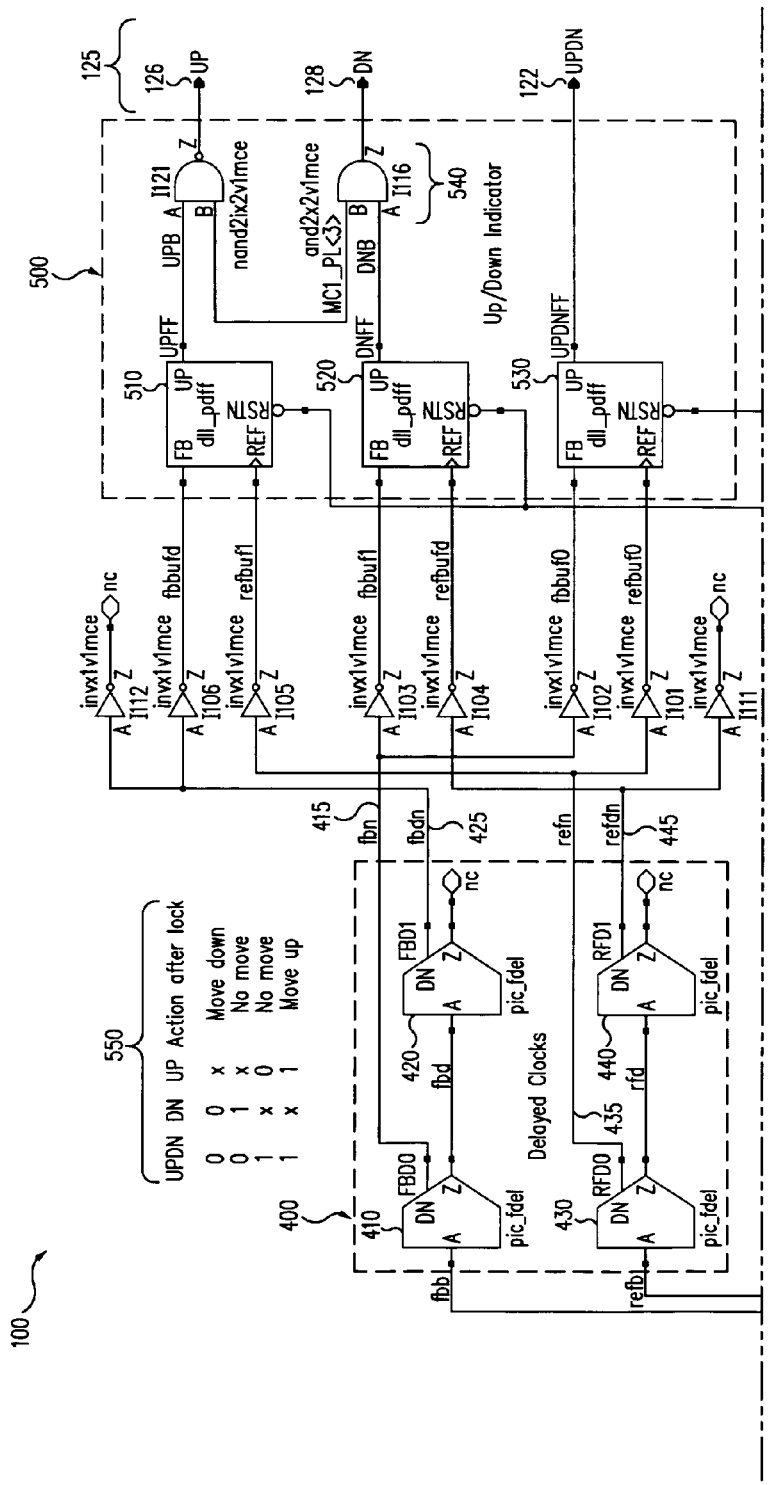
FIG. 2 illustrates a schematic diagram of an exemplary circuit implementation of a phase detector block of the DLL circuit in accordance with an embodiment of the present invention.
Figure 2B:
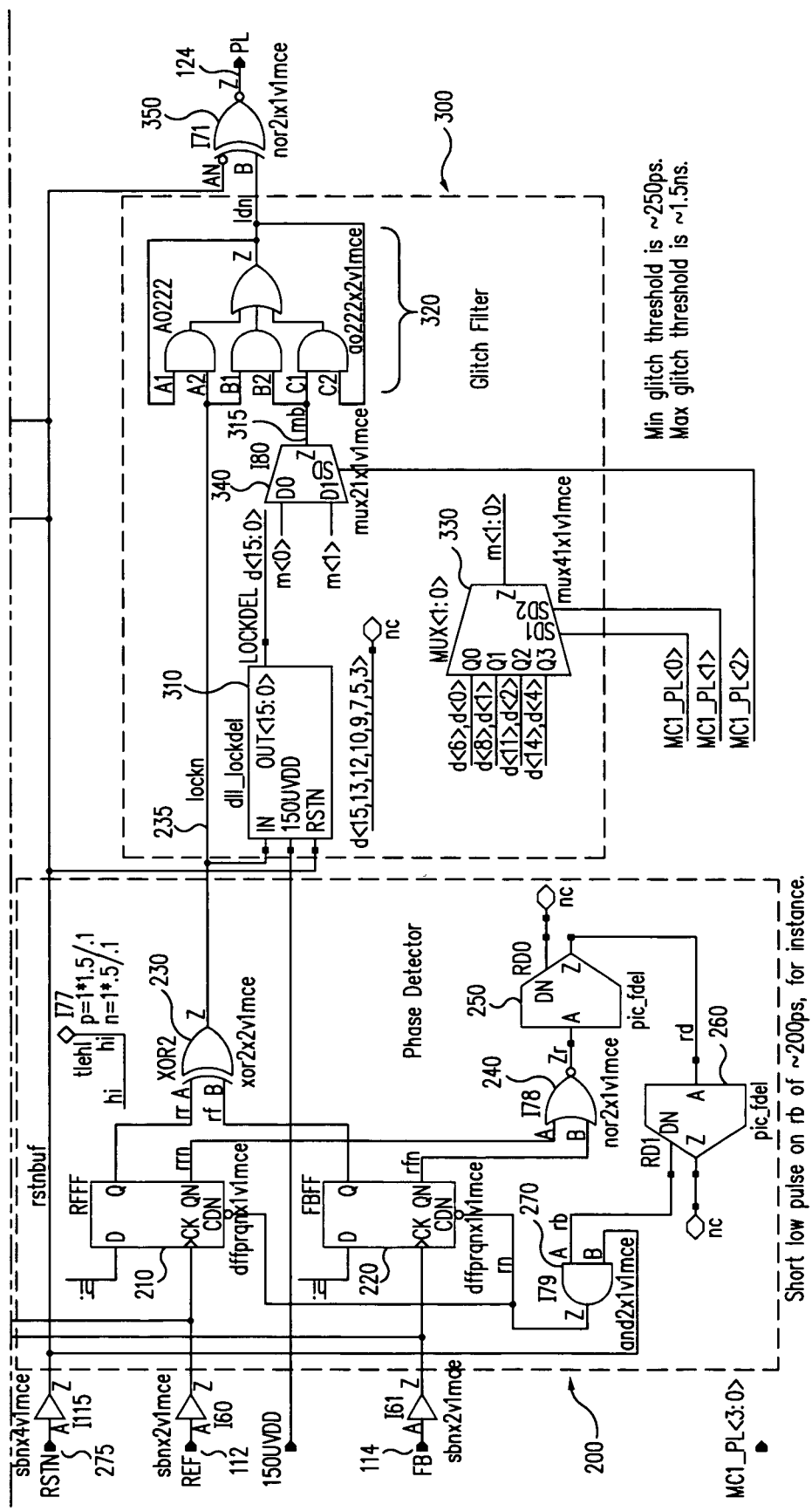

FIG. 2 illustrates a schematic diagram of an exemplary circuit implementation of phase detector block 110 in accordance with an embodiment of the present invention. Phase detector block 110 includes a phase detector circuit 200, a glitch filter circuit 300, delay cells 400, and an up/down indicator circuit 500. Control signals 125 provided by phase detector block 110 to ALU 120 include an UPDN signal 122, a phase lock (PL) signal 124, an UP signal 126, and a DN signal 128, as further described herein.

REF clock signal 112 and FB clock signal 114 are received by phase detector circuit 200 and provided as clock inputs to flip flops 210 and 220, respectively. Data input ports of flip flops 210 and 220 are tied to logical high values which are loaded when REF clock signal 112 and FB clock signal 114 are received. It will be appreciated that phase differences between REF clock signal 112 and FB clock signal 114 will be evidenced by a delay between rising clock edges of the signals. Accordingly, logical high values may be loaded into each of flip flops 210 and 220 at different times. The data values stored by flip flops 210 and 220 are provided to XOR gate 230 which outputs a lockn signal 235. Therefore, lockn signal 235 will exhibit a logical low value when data values stored by flip flops 210 and 220 match, and a logical high value when the data values differ.

In operation, REF clock signal 112 and FB clock signal 114 can be continuously fed into phase detector circuit 200. As a result, lockn signal 235 will toggle between logical low values (i.e., when flip flops 210 and 220 are storing the same value) and logical high values (i.e., when flip flops 210 and 220 are storing different values). This toggling behavior can be understood by further considering the various components of phase detector circuit 200.

In particular, the complement values (QN) of data outputs of flip flops 210 and 220 are provided to NOR gate 240 which outputs a logical low value when both QN data outputs are low (i.e. when both Q data outputs are high), and a logical high value in all other cases. The output of NOR gate 240 passes through delay cells 250 and 260, each of which may provide for example a relatively short delay, such as approximately 200 psec. The inverted output of delay cell 260 is provided to AND gate 270. AND gate 270 also receives an asynchronous reset signal 275 that is set to a logical high value during normal operation and falls to a logical low value when DLL circuit 100 is reset. As illustrated, the output of AND gate 270 is provided to inverted reset ports of flip flops 210 and 220. As a result, flip flops 210 and 220 will be reset to logical low values after both flip flops store logical high values. The delays provided by delay cells 250 and 260 can permit flip flops 210 and 220 to both store logical high values for at least a short period of time (i.e. 2×200 psec) prior to being reset.

The toggling lockn signal 235 is provided to logic block 320 and delay cell 310 of glitch filter circuit 300. Delay cell 310 can be implemented as a variable delay circuit that may be configured to delay lockn signal 235 by a desired delay time selected by multiplexers 330 and 340 to provide a delayed lockn signal 315. In one embodiment, delay cell 310 is configured to delay lockn signal 235 by a delay time in the range of approximately 250 psec to approximately 1.5 nsec. Delayed lockn signal 315 is also provided to logic block 320. It will be appreciated that logic block 320 will output a logical low value unless: lockn signal 235 and delayed lockn signal 315 are both logical high values; lockn signal 235 and the present output of logic block 320 are both logical high values; or delayed lockn signal 315 and the present output of logic block 320 are both logical high values.

As previously discussed, lockn signal 235 will provide a logical high value if flip flops 210 and 220 are storing different data values. However, if REF clock signal 112 and FB clock signal 114 are closely in phase with each other, then lockn signal 235 will only remain at a logical high value for a short time. If lockn signal 235 remains at a logical high value for a time less than the delay time of delay cell 310, then the AND comparison of lockn signal 235 and delayed lockn signal 315 performed by logic block 320 will result in a logical low output. Conversely, if lockn signal 235 remains at a logical high value for a time longer than the delay time of delay cell 310, then the AND comparison of lockn signal 235 and delayed lockn signal 315 performed by logic block 320 will result in a logical high output.

The output of logic block 320 is provided to NOR gate 350 which also receives asynchronous reset signal 275 at an inverted input port. Because asynchronous reset signal 275 remains at a logical high value during normal operation, NOR gate 350 will generally output PL signal 124 at a logical high value unless logic block 320 outputs a logical high value.

As indicated, logic block 320 will output a logical high value when lockn signal 235 remains at a logical high value (indicating a difference between stored data values of flip flops 210 and 220) for a period of time greater than the delay time of delay cell 310. Accordingly, it will be appreciated that PL signal 124 will remain at a logical high value when REF clock signal 112 and FB clock signal 114 exhibit a maximum phase difference that is less than the delay time of delay cell 310. PL signal 124 will fall to a logical low value when REF clock signal 112 and FB clock signal 114 exhibit a phase difference that is approximately equal to or greater than the delay time of delay cell 310. Accordingly, it will be appreciated that a logical high value for PL signal 124 indicates that REF clock signal 112 and FB clock signal 114 are close in phase with each other, having a maximum phase difference approximately equal to the delay time of delay cell 310.

By providing a logical high value for PL signal 124 to ALU 120, phase detector block 110 can inform ALU 120 that REF clock signal 112 and FB clock signal 114 are at least close in phase with each other. In order to further inform ALU 120 as to the phase relationship between REF clock signal 112 and FB clock signal 114, additional control signals 125 may be provided to ALU 120. In this regard, up/down indicator circuit 500 provides UPDN signal 122, UP signal 126, and DN signal 128.

As illustrated, up/down indicator circuit 500 includes a plurality of flip flops 510, 520, and 530 which receive signals from delay cells 400. In one embodiment, each of flip flops 510, 520, and 530 are implemented with matching delay paths between clock and data input ports. Output signals from flip flops 510 and 520 pass through logic block 540 to provide UP signal 126 and DN signal 128, respectively, and the output of flip flop 530 provides UPDN signal 122.

REF clock signal 112 is delayed by delay cell 430 to obtain a delayed REF clock signal 435 which is provided to clock inputs of flip flops 510 and 530. REF clock signal 112 is also delayed by both delay cells 430 and 440 to obtain delayed REF clock signal 445 which is provided to a clock input of flip flop 520. FB clock signal 114 is delayed by delay cell 410 to obtain delayed FB clock signal 415 which is provided to data inputs of flip flops 520 and 530. FB clock signal 114 is also delayed by both delay cells 410 and 420 to obtain delayed FB clock signal 425 which is provided to a data input of flip flop 510. Each of delay cells 410-440 can be implemented for example to have delay times substantially equal to one delay tap of delay cells DEL0-4.

Referring to flip flop 530, it will be appreciated that flip flop 530 will load a logical high value when the rising clock edge of delayed FB clock signal 415 leads the rising clock edge of delayed REF clock signal 435. Because delayed FB clock signal 415 and delayed RF clock signal 435 each pass through one of delay cells 400, a logical high value for UPDN signal 122 will indicate to ALU 120 that FB clock signal 114 should be further delayed by programming an additional delay tap for one of delay cells DEL0-DEL4 in order to further align the phase of FB clock signal 114 with REF clock signal 112. If UPDN signal 122 is at a logical low value, it will indicate to ALU 120 that the number of delay taps programmed for one or more of delay cells DEL0-DEL4 should be reduced.

However, if the phase difference between REF clock signal 112 and FB clock signal 114 falls within the value of a single delay tap (for example, 30 psec), then UPDN signal 122 may cause ALU 120 to repeatedly add and subtract delay taps as FB clock signal 114 is caused to repeatedly lead and lag REF clock signal 112. In order to avoid this jumping back and forth around one delay tap (which can result in excessive jitter in output clock signal 106), UP and DN signals 126 and 128, respectively, can be optionally enabled and used with UPDN signal 122.

UP signal 126 is a delay increment signal that provides a logical high value if FB clock signal 114 leads REF clock signal 112 by more than one delay tap. DN signal 128 is a delay decrement signal that provides a logical low value if FB clock signal 114 lags REF clock signal 112 by more than one delay tap. As a result, ALU 120 can be instructed in accordance with truth table 550 illustrated in FIG. 2. In particular, ALU 120 can be instructed to increase the number of delay taps programmed for one or more of delay cells DEL0-4 when both UPDN signal 122 and UP signal 126 are both logical high values, decrease the number of delay taps when both UPDN signal 122 and UP signal 126 are both logical low values, and leave the number of delay taps unchanged in other cases.

It will be appreciated that truth table 550 applies to implementations where DLL circuit 100 is operated in time reference mode and clock injection removal mode. In clock injection match mode, delay can be added when both UPDN signal 122 and DN signal 128 are logical low values, and subtracted when both UPDN signal 122 and UP signal 126 are logical high values.

As discussed, ALU 120 can be informed by phase detector block 110 to selectively increment or decrement the number of delay taps programmed for delay cells DEL0-4 in response to PL signal 124, UPDN signal 122, UP signal 126, and DN signal 128. In one embodiment, ALU 120 may include a first counter that accumulates logical high values of PL signal 124 provided by phase detector block 110. The first counter may be implemented to increment by 1 each time PL signal 124 remains at a logical high value for an entire clock cycle. ALU 120 may be implemented to enable the increment or decrement of delay taps after the first counter indicates that the PL signal 124 has remained at a logical high value (i.e., indicating that REF clock signal 112 and FB clock signal 114 are close in phase with each other) for a specified number of clock cycles. As a result, ALU 120 can choose to increase or decrease delay taps associated with delay chain 130 when PL signal 124 indicates that REF clock signal 112 and FB clock signal 114 have been consistently close in phase.

ALU 120 may also include a second counter (for example, a 5-bit counter providing values from 0 to 31) which is initially set to a midpoint value (for example, 16). From the midpoint value, ALU 120 will increase or decrease the second counter value by 1 each time it receives signals indicating that delay taps should be added (i.e., when both UPDN signal 122 and UP signal 126 are both logical high values) or subtracted (i.e., when both UPDN signal 122 and DN signal 128 are both logical low values). When the second counter reaches a maximum value (for example, 31), it will instruct delay chain 130 to add one delay tap to one of delay cells DEL0-4, and reset the second counter to the midpoint value. When the second counter reaches a minimum value (for example, 0), ALU 120 will instruct delay chain 130 to subtract one delay tap to one of delay cells DEL0-4, and reset the second counter to the midpoint value. In one embodiment, the counter size may be programmable.

As a result, ALU 120 can choose to increase or decrease delay taps associated with delay chain 130 when UPDN signal 122, UP signal 126, and DN signal 128 have provided signals that illustrate a consistent preference to increase or decrease delay taps. Accordingly, variations in these signals attributable to jitter in REF clock signal 112 or FB clock signal 114 can be effectively filtered out. In addition, the use of the second counter can provide sufficient time for the effects of previously increased or decreased delay taps to propagate through DLL circuit 100.

Figure 3:
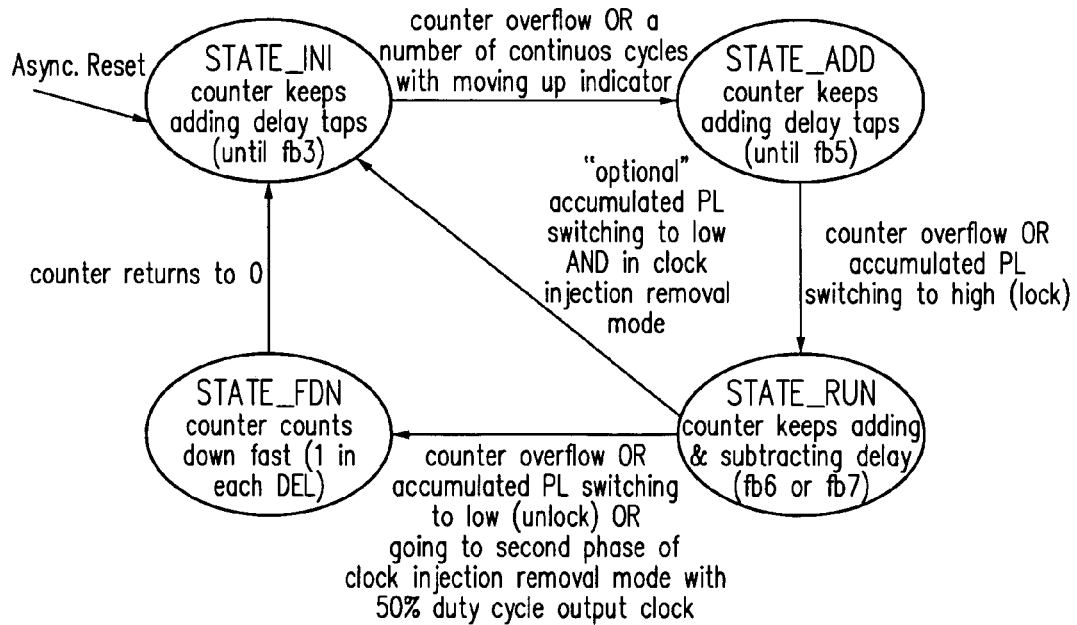
FIG. 3 illustrates a state machine diagram of an arithmetic logic unit (ALU) for the DLL circuit in accordance with an embodiment of the present invention.
Figure 4:
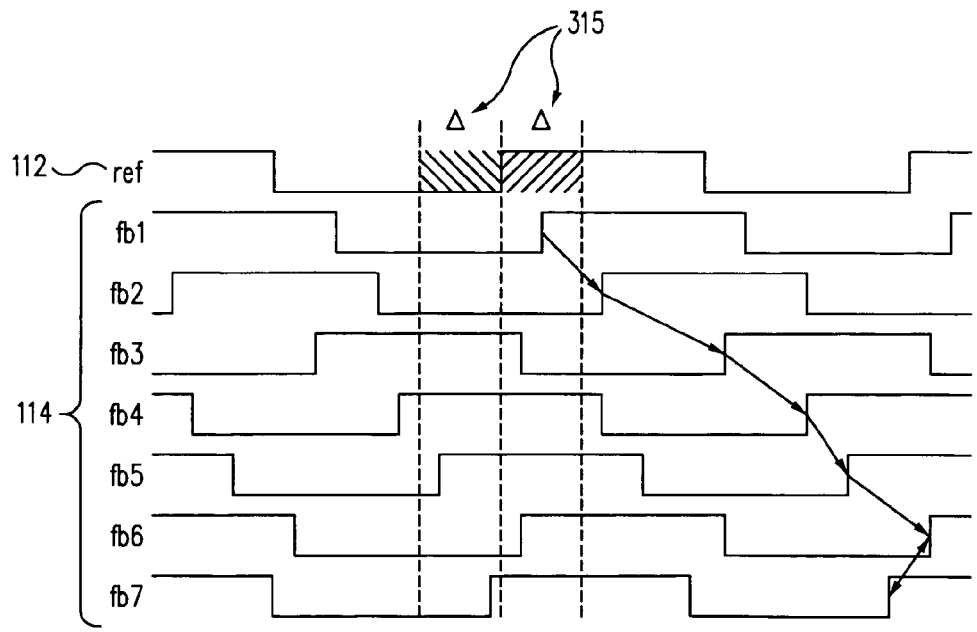
FIG. 4 illustrates a timing diagram of reference and feedback signals in accordance with an embodiment of the present invention.

FIG. 3 illustrates a state machine diagram of ALU 120 in accordance with an embodiment of the present invention, and FIG. 4 illustrates a timing diagram of reference and feedback signals in accordance with an embodiment of the present invention. In particular, FIG. 4 illustrates phase relationships between REF clock signal 112 and FB clock signal 114 when one or more of delay cells DEL0-4 are programmed with various numbers of delay taps.

Following a reset of DLL circuit 100, delay cells DEL0-4 are each set to zero delay taps and flip flops 210 and 220 of phase detector circuit 200 are reset to store logical low data values. As a result, FB clock signal 114 may correspond to fb1 signal of FIG. 4. As illustrated in FIG. 4, fb1 signal exhibits a delay with respect to REF clock signal 112 that is less than a delay time 315 (denoted by a shaded Δ region) of delay cell 310. As a result, PL signal 124 will exhibit a logical high value, and each of UPDN signal 122 and DN signal 128 will exhibit logical low values. As previously described with regard to FIG. 2, such a combination of signals would normally instruct ALU 120 to subtract a delay tap from one of delay cells DEL0-4. However, when DLL circuit 100 has been reset, all delay cells DEL0-4 will already be set to zero values. To address this condition, ALU 120 can be implemented with a state machine.

Referring to the state machine of FIG. 3, ALU 120 initially begins at STATE_INI following a reset of DLL circuit 100 where delay cells DEL0-4 are each set to zero delay taps and flip flops 210 and 220 of phase detector circuit 200 are storing logical low data values. While in STATE_INI, ALU 120 will add one delay tap every 16 clock cycles to move FB clock signal 114 from position fb1 to at least position fb3 where UPDN signal 122 and UP signal 126 both provide logical high values. When UPDN signal 122 and UP signal 126 have remained at a logical high values for a desired number of clock cycles, ALU 120 will transition to STATE_ADD.

In STATE_ADD, ALU 120 will continue to add delay taps to move FB clock signal 114 from position fb3 to at least position fb5 where PL signal 124 provides a logical high value. Accordingly, it will be appreciated that by continuing to add delay taps until FB clock signal 114 has reached at least position fb5, DLL circuit 100 can prevent FB clock signal 114 from becoming trapped at position fb1. When PL signal 124 has remained at a logical high value for a desired number of clock cycles, ALU 120 will transition to STATE_RUN. STATE_RUN is the normal operating state of ALU 120 in which ALU 120 will increment or decrement the number of delay taps in delay cells DEL0-4 in the manner previously described in relation to FIG. 2.

In this regard, ALU 120 may increment individual delay taps in delay cells DEL0-3 by adding or subtracting a single delay tap to one delay cell at a time. For example, ALU 120 may increment delay cell DEL3 by one delay tap. If an additional delay tap is called for, ALU 120 may then increment delay cell DEL2 by one delay tap. This process can continue for delay cells DEL1-DEL0, and repeat beginning again with delay cell DEL3. The order of subtracting delay taps can occur in reverse order beginning with delay cell DEL0. As a result, the number of delay taps programmed into each of delay cells DEL0-3 at any time will vary by a maximum of only one delay tap. Delay cell DEL4 can be programmed to mirror the number of delay taps programmed into delay cell DEL0, or may be configured with any desired number of delay taps to implement optional delay offset amounts or division by 2 or 4.

It will be appreciated that phase lock can be obtained in STATE_RUN where the phases between REF clock signal 112 and FB clock signal 114 are aligned within one delay tap (for example, within approximately 30 psec) as indicated in positions fb6 and fb7 of FIG. 4. In this case, ALU 120 may assert a lock signal 127. If phase lock is lost, ALU 120 will transition to STATE_FDN where four delay taps are subtracted (i.e., 1 delay tap for each of delay cells DEL0-3) every 4 clock cycles until delay cells DEL0-3 are all set to zero delay taps and ALU 120 transitions back to STATE_INI. Advantageously, by employing such a "fast counting down" process during STATE_FDN, ALU 120 can quickly return to STATE_INI and begin to again increment individual delay taps in a controlled manner, thereby reducing the likelihood of glitches appearing in output clock signal 106 when phase lock is lost. Optionally, where DLL circuit 100 is operated in clock injection removal mode and duty cycle block 140 is not used, ALU 120 will transition from STATE_RUN directly to STATE_INI when phase lock is lost.

Figure 5:
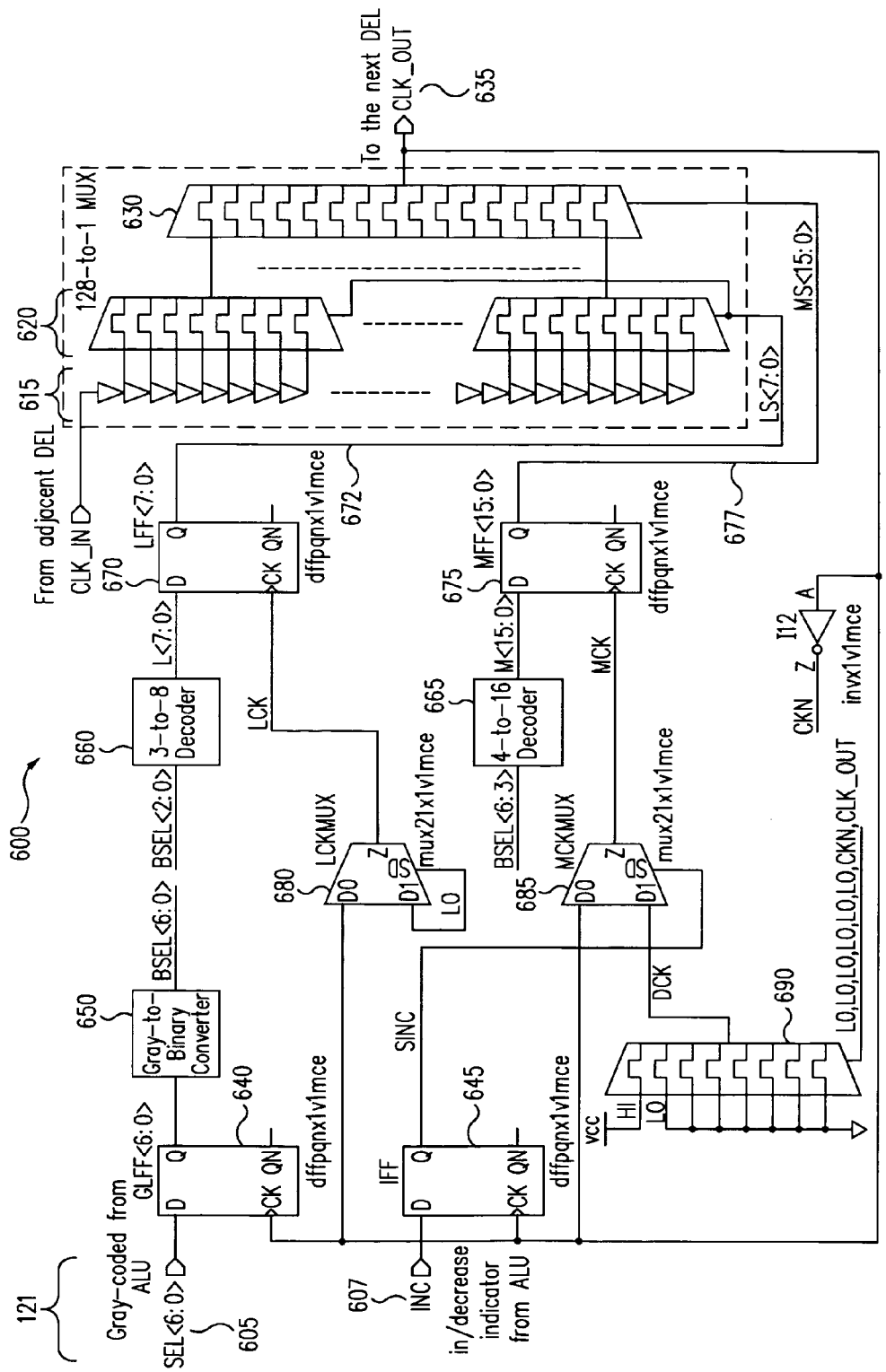
FIG. 5 illustrates a schematic diagram of an exemplary delay circuit in accordance with an embodiment of the present invention.

FIG. 5 illustrates a schematic diagram of a delay circuit 600, which is an exemplary circuit implementation for any of the delay cells DEL0-4 in accordance with an embodiment of the present invention. Delay circuit 600 includes a plurality of delay taps 615 (for example, 128 delay taps) which are provided to a 128-to-1 transmission gate circuit comprising a plurality of multiplexers 620 (for example, 8-to-1 or 4-to-1 multiplexers) which feed multiplexer 630 (for example, a 16-to-1 multiplexer). Multiplexers 620 receive select signals 672 which may, for example, be implemented as a set of 8 signals. Multiplexer 630 receives select signals 677 which may, for example, be implemented as a set of 16 signals. In addition, select signals 672 and select signals 677 may be implemented as mutually exclusive high signals such that only one of select signals 672 and only one of select signals 677 exhibit a logical high value at any time.

Delay circuit 600 receives a plurality of control signals 605 at a flip flop 640 and an INC signal 607 at a flip flop 645. It will be appreciated that signals 605 and 607 are a subset of control signals 121 provided by ALU 120 to delay chain 130 for programming the number of delay taps for delay cells DEL0-4. As discussed, only a single delay tap is added or subtracted from delay cells DEL0-3 while ALU 120 is operating in STATE_RUN. As a result, control signals 605 can be implemented as Gray-coded signals exhibiting only one bit change for each addition or subtraction of delay taps during STATE_RUN. Advantageously, this implementation can permit control signals 605 to be passed between clock domains from ALU 120 to delay circuit 600 without inducing glitches in local clock signal 635 and output clock signal 106.

Control signals 605 are stored by flip flop 640 and provided to a Gray-to-binary converter 650 which provides control signals 605 in binary form to decoders 660 and 665. INC signal 607 can be implemented to exhibit a logical high value when ALU 120 seeks to increase the number of delay taps currently programmed into delay circuit 600. INC signal 607 is stored by flip flop 645 and is provided to the select input of multiplexer 685.

As illustrated, multiplexer 630 provides a local clock signal 635 which corresponds to one of delayed clock signals 10-14. Local clock signal 635 is fed back to flip flops 640 and 645, multiplexers 680 and 685, and transmission gate multiplexer 690. Local clock signal 635 will exhibit greater or lesser delay, depending on the number of delay taps 615 selected by select signals 672 and 677. However, it will be appreciated that if select signals 672 and select signals 677 are both incrementing, it is possible that local clock signal 635 may be unpredictable, depending on whether multiplexers 620 change values before or after multiplexer 630.

In order to prevent possible glitching of local clock signal 635, select signals 677 can be delayed with respect to select signals 672 when the number of delay taps is increasing. Accordingly, when INC signal 607 is asserted and select signals 672 are transitioning from a logical high value on bit LS<7> to a logical high value on bit LS<0>, the clock input to flip flop 675 will be delayed by the time required for transmission gate multiplexer 690 to effect a similar change. As a result, if the high pulse width of local clock signal 635 is at least longer than the delay of transmission gate multiplexer 690 and the clock-q delay of multiplexers 670 and 675, local clock signal 635 will not exhibit a glitch for single increments to the programmed number of delay taps 615.

Figure 6:
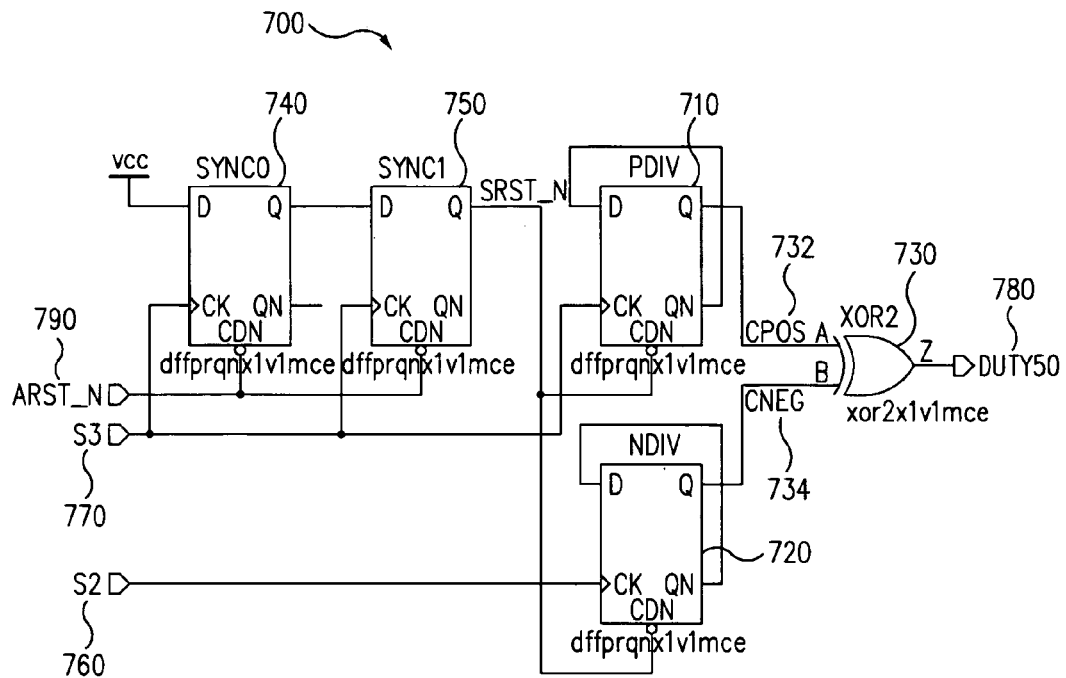
FIG. 6 illustrates a schematic diagram of an exemplary duty cycle circuit in accordance with an embodiment of the present invention.

FIG. 6 illustrates a duty cycle circuit 700 which is an exemplary circuit implementation for duty cycle block 140 in accordance with an embodiment of the present invention. It will be appreciated that duty cycle block 140 may be implemented in accordance with duty cycle circuit 700. As set forth in FIG. 6, duty cycle circuit 700 includes flip flops 710, 720, 740, and 750, as well as an XOR gate 730.

Duty cycle circuit 700 receives clock signals 760 and 770 from multiplexers 152 and 153, respectively, which are provided as clock inputs to flip flops 710 and 720, respectively. Clock signal 770 is also provided to clock inputs of flip flops 740 and 750. The inverted data outputs of flip flops 710 and 720 are fed back into their corresponding data inputs. Data values stored by flip flops 710 and 720 are provided to XOR gate 730 as CPOS signal 732 and CNEG signal 734, respectively. XOR gate 730 provides a duty cycle signal 780 which can be provided to multiplexer 154 as illustrated in FIG. 1.

Duty cycle circuit 700 also receives a reset signal 790 which can be set to a logical high value by ALU 120 when the state machine of FIG. 3 enters STATE_RUN and clock signals 760 and 770 exhibit a significant phase difference. The data output of flip flop 750 is provided to clock divider flip flops 710 and 720 to generate CPOS and CNEG signals 732 and 734, respectively. It will be appreciated that CPOS signal 732 will alternate between logical high values and logical low values in response to rising clock edges of clock signal 770. Similarly, CNEG signal 734 will alternate between logical high values and logical low values in response to rising clock edges of clock signal 760.

Figure 7:
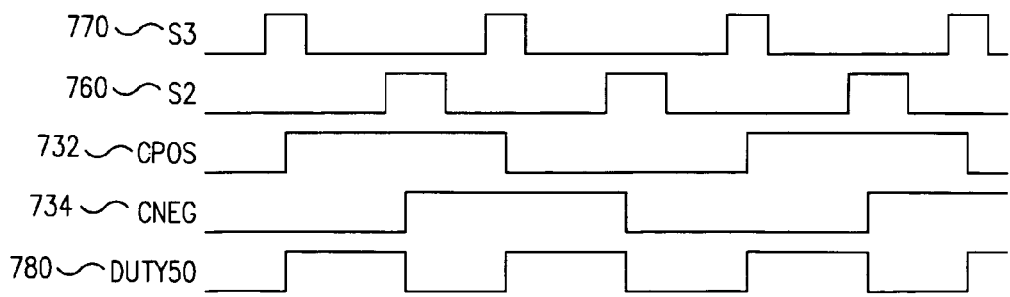
FIG. 7 illustrates a timing diagram of an exemplary duty cycle circuit in accordance with an embodiment of the present invention.

FIG. 7 illustrates a timing diagram of duty cycle circuit 700 in accordance with an embodiment of the present invention. As set forth in FIG. 7, clock signals 760 and 770 are 180 degrees out of phase with each other, and CPOS and CNEG signals 732 and 734 exhibit the behavior described above. By performing an XOR operation on CPOS and CNEG signals 732 and 734 while DLL circuit 100 is operated in time reference mode (i.e., where delay cells DEL0-3 provide delayed clock signals at 90 degree, 180 degree, 270 degree, and 360 degree phases), duty cycle signal 780 can be obtained as indicated in FIG. 7. It will be appreciated that if clock signal 760 is phase shifted 90 degrees or 270 degrees from clock signal 770, duty signal 780 will exhibit a 25% or 75% duty cycle, respectively.

In another embodiment, duty cycle block 140 is used in a two phase approach. In a first phase, DLL circuit 100 is initially operated in time reference mode until delay cells DEL3-4 are programmed to collectively provide a delay time approximately equal to one half clock period of reference clock signal 102 (i.e., delayed clock signal 14 is shifted 180 degrees and 90 degrees out of phase with delayed clock signals 12 and 13, respectively).

In a second phase, the delay tap values programmed in delay cells DEL3-4 are frozen by ALU 120 (i.e., by maintaining the values of the subset of control signals 121 directed to delay cells DEL3-4), duty block 140 is reset (i.e., by assertion of reset signal 790), and DLL circuit 100 is switched to operate in clock injection removal mode with one or more of delay cells DEL0-2 now being used for clock injection removal. As a result, ALU 120 transitions to STATE_FDN where it reduces the delay taps programmed for delay cells DEL0-2 to zero. ALU 120 then transitions through states STATE_INI, STATE_ADD, and STATE_RUN where it adjusts the delay taps programmed for delay cells DEL0-2. Because DLL circuit 100 is now operating in clock injection removal mode, the aggregate delay time of delay cells DEL0-2 and system clock distribution will correspond to an integer multiple of the clock cycle of reference clock signal 102.

Accordingly, if multiplexers 152, 153, and 155 select delayed clock signals 14, 12, and 13, respectively, clock signal 760 provided by multiplexer 152 will be phase shifted 180 degrees from clock signal 770 provided by multiplexer 153), and duty cycle block 140 will accordingly provide a duty cycle signal 780 exhibiting a 50% duty cycle. Alternatively, duty cycle signal 780 can exhibit a 25/75% duty cycle if multiplexer 152 is switched to select delayed clock signal 13 instead.

It will be appreciated that by utilizing the two phase approach described above, delay cells DEL0-2 can be used to cancel clock injection, while delay cells DEL3-4 can simultaneously be used with duty cycle block 140 to provide a desired duty cycle for clock output signal 106. In view of the present disclosure, it will be appreciated that a DLL circuit 100 in accordance with various embodiments set forth herein can maintain a consistent phase lock despite the presence of jitter in input clock signals. In particular, phase differences between REF clock signal 112 and FB clock signal 114 can be filtered out to the extent that such phase differences are less than the delay time programmed for delay cell 310 of phase detector block 110.

In addition, through the use of control signals 125 provided to ALU 120, delay taps can be selectively added and subtracted without inducing excessive jitter in output clock signal 106 provided by DLL circuit 100. The use of duty cycle block 140 can also provide consistent reliable duty cycle performance for output clock signal 106.

It will further be appreciated that the state machine of ALU 120 referenced in FIG. 3 can prevent FB clock signal 114 from becoming trapped in an out-of-phase position. Furthermore, the state machine of FIG. 3 as well as the delay of select signals 677 referenced in FIG. 5 can reduce the likelihood of glitches appearing in output clock signal 106.

Embodiments described above illustrate but do not limit the invention. It should also be understood that numerous modifications and variations are possible in accordance with the principles of the present invention. Accordingly, the scope of the invention is defined only by the following claims.

We claim:

1. A jitter-tolerant delay-locked loop (DLL) circuit comprising a phase detector, the phase detector including:
   a phase detector circuit adapted to compare a reference clock signal and a feedback clock signal and to output in response a first phase lock signal; and
   a filter circuit including:
      a delay cell adapted to output a plurality of delayed phase lock signals based on the first phase lock signal, the delayed phase lock signals having different delay times; and
      digital logic adapted to combine the first phase lock signal with a selected delayed phase lock signal and to output in response a second phase lock signal, the second phase lock signal indicating a phase lock between the reference clock signal and the feedback clock signal if the first phase lock signal and the selected delayed phase lock signal have a first set of logic values and indicating no phase lock if the first phase lock signal and the selected delayed phase lock signal have a second set of logic values.

2. The DLL circuit of claim 1 wherein the filter circuit within the phase detector further includes a multiplexer having input terminals coupled to the delay cell and a select terminal coupled to a configuration memory cell, the multiplexer adapted to select a delayed phase lock signal from the plurality of delayed phase lock signals provided by the delay cell.

3. The DLL circuit of claim 1 wherein the phase detector further includes an up/down circuit adapted to generate:
   a first control signal indicating whether the feedback clock signal leads or lags the reference clock signal;
   a second control signal indicating whether the feedback clock signal leads the reference clock signal by more than a specified time; and
   a third control signal indicating whether the feedback clock lags leads the reference clock signal by more than a specified time.

4. The DLL circuit of claim 3 including:
   a delay chain of delay cells adapted to delay the reference clock signal, the delay cells including programmable delay taps that have associated delay times; and
   an ALU circuit coupled between the phase detector and the delay chain and adapted to vary the number of delay taps that delay the reference clock signal, the ALU circuit responsive the states of the second phase lock signal and the first, second, and third control signals.

5. The DLL circuit of claim 4 wherein the ALU circuit is adapted to:
   not vary the number of delay taps if the second phase lock signal indicates a phase lock between the reference clock signal and feedback clock signal;
   not vary the number of delay taps if the first control signal indicates the feedback clock signal leads the reference clock signal and the second control signal does not indicate the feedback clock signal leads the reference clock signal by more than the specified time;
   vary the number of delay taps if the first control signal indicates the feedback clock signal leads the reference clock signal and the second control signal indicates the feedback clock signal leads the reference clock signal by more than the specified time;
   not vary the number of delay taps if the first control signal indicates the feedback clock signal lags the reference clock signal and the third control signal does not indicate the feedback clock signal lags the reference clock signal by more than the specified time; and
   vary the number of delay taps if the first control signal indicates the feedback clock signal lags the reference clock signal and the second control signal indicates the feedback clock signal lags the reference clock signal by more than the specified time.

6. The DLL circuit of claim 4 wherein the ALU circuit includes a counter adapted to count the number of consecutive clock periods during which the second phase lock signal indicates a phase lock between the reference clock signal and the feedback clock signal, the ALU circuit adapted to vary the number of delay taps if the counter reaches a specified number of consecutive clock periods.

7. The DLL circuit of claim 4 wherein the ALU circuit includes a counter adapted to count in one direction each time the first and second control signals indicate a delay tap should be added and to count in the other direction each time the first and third control signals indicate a delay tap should be subtracted, the ALU adapted to add a delay tap if the counter reaches a first specified count in the one direction and to subtract a delay tap if the counter reaches a second specified count in the other direction, the ALU further adapted to reset the counter if the counter reaches the first or second specified count.

8. In a delay-locked loop (DLL) circuit, a method of producing a jitter-tolerant phase lock signal, the method comprising:
   comparing a reference clock signal and a feedback clock signal to output a first phase lock signal, the first phase lock signal including jitter;
   providing a plurality of delayed phase lock signals based on the first phase lock signal, the delayed phase lock signals having different specified delay times; and
   comparing the first phase signal with a selected one of the delayed phase lock signals to output a second phase lock signal, the second phase lock signal indicating a phase lock between the reference clock signal and the feedback clock signal if the delay time of the selected delayed phase lock signal exceeds the jitter in the first phase lock signal and indicating no phase lock if the jitter in the first phase lock signal exceeds delay time of the selected delayed phase lock signal.

9. A jitter-tolerant delay-locked loop (DLL) circuit comprising:
   a phase detector adapted to compare a reference clock signal and a feedback clock signal and to output in response a first phase lock signal, the phase detector further adapted to provide a jitter-tolerant phase lock signal based on a comparison of the first phase lock signal with a selected one of a plurality of delayed phase lock signals and to provide a control signal indicating whether the feedback clock signal leads or lags the reference clock signal;

a delay chain of delay cells adapted to delay the reference clock signal, the delay cells including programmable delay taps that have associated delay times; and a logic circuit coupled between the phase detector and the delay chain and adapted to vary the number of delay taps that delay the reference clock signal, the logic circuit responsive to the states of the jitter-tolerant phase lock signal and the control signal.

* * * * *

UNITED STATES PATENT AND TRADEMARK OFFICE
CERTIFICATE OF CORRECTION

PATENT NO. : 7,620,839 B2  
APPLICATION NO. : 11/302097  
DATED : November 17, 2009  
INVENTOR(S) : Chen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Twenty-sixth Day of October, 2010

David J. Kappos  
*Director of the United States Patent and Trademark Office*